(12) United States Patent
Burnham et al.

(10) Patent No.: US 8,495,738 B2
(45) Date of Patent: Jul. 23, 2013

(54) STEALTH NETWORK NODE

(75) Inventors: James B. Burnham, San Ramon, CA (US); Neil R. Lofland, San Jose, CA (US); Michael Hegarty, Bellevue, NE (US); Robert W. Hale, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/278,861

(22) Filed: Oct. 21, 2011
(Under 37 CFR 1.47)

(65) Prior Publication Data
US 2013/0104228 A1   Apr. 25, 2013

(51) Int. Cl.
*H04L 29/06* (2006.01)
(52) U.S. Cl.
USPC ................................ 726/22; 726/3
(58) Field of Classification Search
USPC ...................................... 726/22, 3
See application file for complete search history.

(56) References Cited

U.S. PATENT DOCUMENTS

| 7,926,104 | B1 * | 4/2011 | Sundaram et al. | 726/22 |
| 2003/0037142 | A1 * | 2/2003 | Munger et al. | 709/225 |
| 2011/0277032 | A1 * | 11/2011 | Vargas | 726/23 |

OTHER PUBLICATIONS

Sifalakis et al. "Network address hopping: a mechanism to enhance data protection for packet communications," May 16-20, 2005, ICC 2005 IEEE pp. 1518-1523 vol. 3.*
Sifalakis, Manolis, et al.; Network Address Hopping: A Mechanism to Enhance Data Protection for Packet Communications; Proceedings of 40th Annual IEEE International Conference on Communications, Seoul, Korea, May 2005, pp. 6.

* cited by examiner

*Primary Examiner* — Kambiz Zand
*Assistant Examiner* — Michael Guirguis
(74) *Attorney, Agent, or Firm* — Ronald E. Prass, Jr.; Prass LLP

(57) ABSTRACT

A method, a network node, and a set of instructions are disclosed. A network interface 260 may have a precedent network address to represent the network node 104 in the network 100. A processor 210 may recognize an address hop trigger. The processor 210 may change to a successor network address to represent the network node 104 in the network 100.

6 Claims, 4 Drawing Sheets

| Node ID 310 | Trigger 320 | Precedent Address 330 | Successor Address 1 340 | Successor Address N 340 |
|---|---|---|---|---|
| | Time 322 | | | |
| | Event 324 | | | |

300
Figure 3

STEALTH NETWORK NODE

BACKGROUND

1. Field of the Invention

The present invention relates to a method and system for protecting a network node. The present invention further relates to using network address hopping to prevent service attacks.

2. Introduction

Many cyber attacks rely on the discovery of network addresses, followed by exploitation. A discovery attempt may scan a network to identify a target address to attack that target address. The internet may use open network protocols that attackers may exploit by mapping a network and exploiting connected nodes. The nodes may be internet protocol addressable entities, such as devices, virtual machines, processes, and other network entities. Blocking discovery and exploitation on a network having open internet protocols using existing tools may limit network capabilities. Currently deployed technologies, such as virtual private networks, firewalls, and others, may recognize and react to malicious activity or limit aspects of reachability.

SUMMARY OF THE INVENTION

A method, a network node, and a set of instructions are disclosed. A network interface may have a precedent network address to represent the network node in the network. A processor may recognize an address hop trigger. The processor may change to a successor network address to represent the network node in the network.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIG. 3 illustrates, in block diagrams, one embodiment of an address hopping instruction.

DETAILED DESCRIPTION OF THE INVENTION

Figure 1:
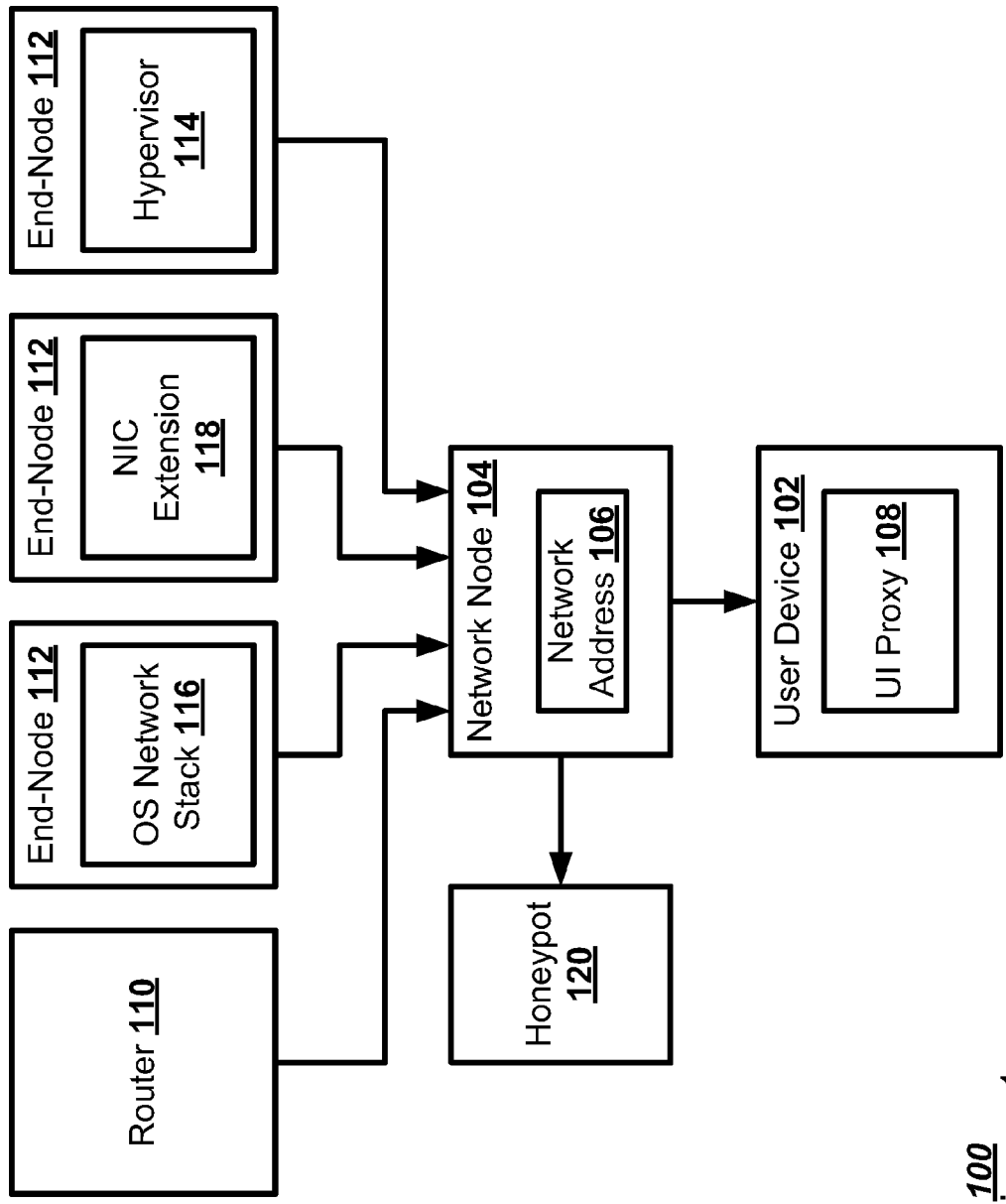
FIG. 1 illustrates, in a block diagram, one embodiment of stealth node network.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an electronic device, and a set of instructions, and other embodiments that relate to the basic concepts of the invention. The electronic device may be any manner of computer, mobile device, wireless communication device, or general purpose electronic device. The set of instructions may reside in a storage medium. The set of instructions may be executable by a processor to implement a method for addressing a network node.

A method, a network node, and a set of instructions are disclosed. A network interface may have a precedent network address to represent the network node in the network. A processor may recognize an address hop trigger. The processor may change to a successor network address to represent the network node in the network.

A collection of two or more network nodes may be seeded with a "hopping" scheme. This hopping scheme may establish logical channels for communication that use source and destination network addresses, such as internet protocol (IP) addresses; IP security associations (IPSec SA); ports; or other contact information. The hopping scheme may be a time or event-based schedule for switching communications among these logical channels.

The hopping scheme may render participating nodes "unreachable" with respect to most current exploits that require staged activities, such as a map-fingerprint-exploit attack. Attacks, such as a distributed denial of service, may be discouraged via their dependence on a common, reachable target. Tools supporting common attacks, such as a network mapper (NMAP), may be rendered ineffective due to their inability to connect to a node over a long enough period of time to reach the attack delivery stage.

Optionally, a "leave-behind" honeypot may be introduced in conjunction with the hopping scheme. A honeypot is a computer, server, or network site that detects, deflects, or counteracts unauthorized attempts at use of an information network. The honeypot may additionally offer a unique method for "in-line" analysis or other activities.

A collection of nodes or node containers, such as hypervisor, may be configured with a shared scheme for hopping among logical communication channels among nodes in the collection. Selection of appropriate schemes and protection of the distributed schemes, in-transit and at-rest, may leverage known methods at varying assurance levels. An address hopping management entity may be an end node or a network-wide infrastructure that accomplishes the same effect by variable routing FIG. 1 illustrates, in a block diagram, one embodiment of stealth node network 100. The network 100 may wired or wireless. A user device 102 may connect to a network node 104 to access data or applications stored in a network 100. A network node 104 may be any router, server, or other network device in a network 100. A user device 102 may also be considered a network node 104. The network node 104 may have a network address 106 to identify the network node 104 to other devices and nodes in the network 100. The network address 106 may identify the source of transmissions from the network node 104 and allow access to the network node 104.

A network node 104 may use a network address hopping scheme to prevent unauthorized access to the network node 104. The network node 104 may start with a precedent network address 106 and switch to a successor network address 106 upon recognizing an address hop trigger. A successor network address may be a precedent network address for the next successor network address. The address hop trigger may be a temporal hop trigger or an event hop trigger. For example, the network node 104 may switch network addresses every thirty seconds or upon sending a set amount of data to the user device 102. The user device 102 may execute a proxy 108 to present the user with a seamless connection experience while the network address is changing. For example, the user device 102 may execute a transmission control protocol (TCP) IP proxy to maintain a TCP session.

The network address hopping pattern may be established by an address hopping management entity at the network node 104, the user device 102, or at an outside device. The network node 104 may receive a network address hopping pattern from an address hopping management entity at a router 110 or an end-node 112 executing a hypervisor 114, an operating system (OS) network stack 116, or a network interface card (NIC) extension 118.

With hypervisor 114 based hopping, a hypervisor 114 may have the functionality to support a hopping scheme, including management of the hopping scheme for local and destination nodes, time or event-based triggers, execution of hopping for local nodes, destination address mapping, and hosting of protocol adaptors and network services to hide hopping from application layers.

For network stack integration, the same functionality may be integrated with end-node operating system network stacks 116 or as NIC extensions 118. Both the hypervisor 114 and network stack integration may use a schema that prevents processes or virtual machines from identifying the current network address, such as an internal network address translation.

For relocation of virtual machines, redistributing virtual machine instances may be enhanced with a hopping scheme supplemented by a hypervisor or client network stack-based destination address mapping and hosting of protocol adaptors and network services.

Each address hopping management entity may approach the refresh rate in different ways. The refresh rate refers to the rate at which a network node 104 may practically complete a hop while effectively hiding the node from attackers. Current mapping and fingerprinting procedures may be relatively slow due to multiple interactions with nodes. NMAP, for example, may take hours to fingerprint nodes with a reasonably sized address range. However, future mapping and fingerprinting approaches may be massively parallel. The hypervisor 114 may localize the refresh to the hypervisor and a client virtual machine. The end node 112 network stack 116 may localize the refresh to the network node 104. In virtual machine location, the refresh may transfer the entire virtual machine.

Additionally, the address hopping management entity may define time or event-based address hopping triggers to preserve packet flows. Time-based address hopping triggers may be less observable, with potential loss of packets mitigated with protocol adaptors. Event-based address hop triggers may be more visible and with coordination across nodes. Further, the address hopping management entity may use a combination of time and event based address hopping triggers.

The address hopping management entity may select from an allocation of address pools with sufficient size to achieve desired level of stealth and impacts on network topology. The address hopping management entity may define the maximum pool of available addresses for a given network node 104 by the host portion of the address with consideration for reserved addresses. The address hopping management entity may use classless internet domain routing or internet protocol version 6 to increase variation and pool size.

The address hopping management entity or the network node may mitigate impact to the application layer. A network node 104 at each hop may interrupt delivery of packets. Protocols from layer 3, such as IPSec, and layer 4, such as TCP, may use proxies in order to isolate higher levels of the network stack from impacts due to hopping. Layer 2 protocols may be generally receptive to a router or end-node approaches.

The address hopping management entity or the network node may prevent derivation of IP address from other information on the network. The address hopping management entity may seek to avoid association of an IP address with non-changing information that is visible on the network, such as domain name system (DNS), media access control (MAC) address, and other data associated with IP addresses.

The network node 104 may use a honeypot 120 to provide a further layer of protection of malicious attacks. The honeypot 120 may be run out of the network node 104 or set up as a separate network node 104. The honeypot 120 may take over the initial network address 106 after being used by the network node 104. The honeypot 120 may then log, analyze, or process any attempts to contact the network node 104 after the address hop trigger.

Figure 2:
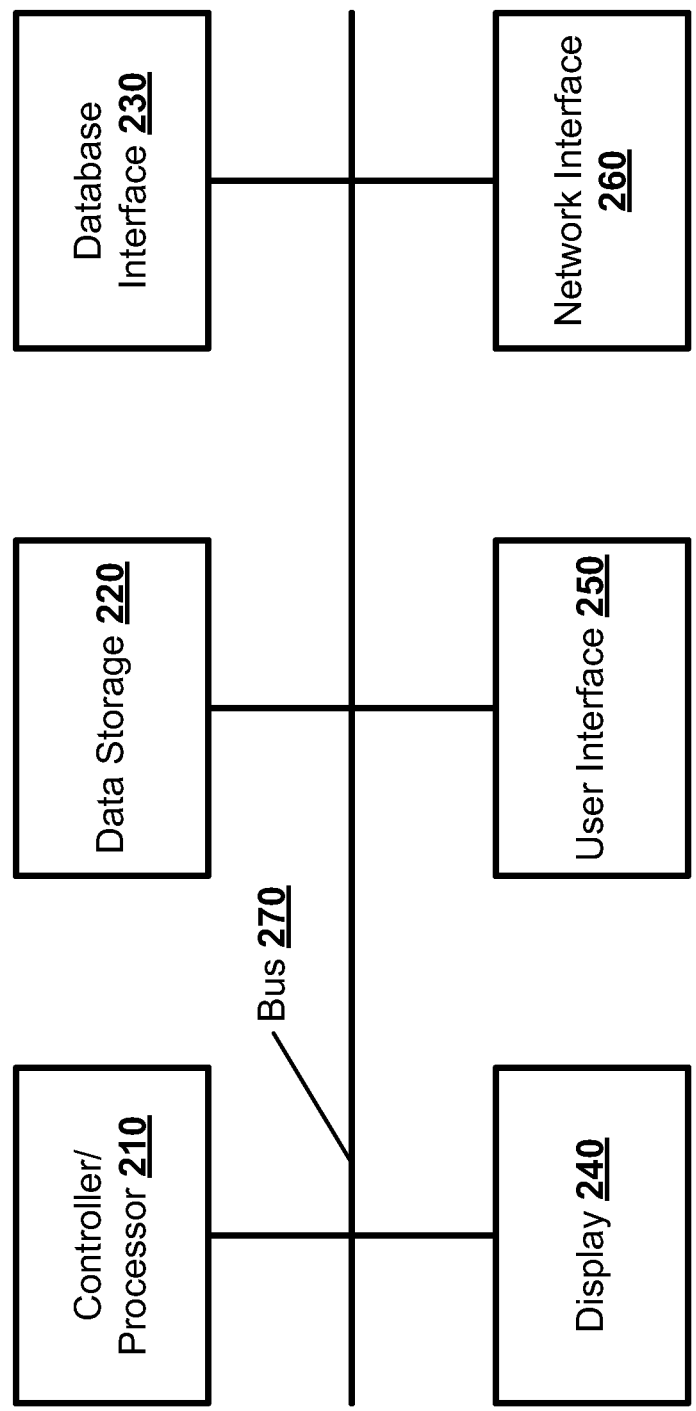
FIG. 2 illustrates, in a block diagram, one embodiment of a computing device.

FIG. 2 illustrates a possible configuration of a computing system 200 to act as a user device 102, a network node 104, a router 110, or an end node 112. The computing system 200 may include a controller/processor 210, a memory 220, a database interface 230, a display 240, a user interface 250, and a network interface 260, connected through bus 270. The network server 200 may implement any operating system. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the disclosed method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein may be used to implement the disclosed system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows content to be directly uploaded into the system.

Data may be stored in the memory or in a separate database. The database interface 230 may be used by the controller/processor 210 to access the database. The display 240 may be a device that presents a visual representation or a graphical user interface (GUI) to the user.

The user interface 250 may be connected to one or more input devices that may include a keyboard, mouse, pen-operated touch screen or monitor, voice-recognition device, or any other device that accepts input. The user interface 250 may also be connected to one or more output devices, such as a monitor, printer, disk drive, speakers, or any other device provided to output data. The user interface 250 may receive a data task or connection criteria from a network administrator.

The network connection interface 260 may be connected to a communication device, modem, network interface card, a transceiver, or any other device capable of transmitting and receiving signals from the network. The network connection interface 260 may be used to connect a client device to a network. The components of the network server 200 may be connected via an electrical bus 270, for example, or linked wirelessly.

Client software and databases may be accessed by the controller/processor 210 from memory 220, and may include, for example, database applications, word processing applications, as well as components that embody the disclosed functionality of the present invention. The network server 200 may implement any operating system. Client and server software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

FIG. 3 illustrates, in block diagrams, one embodiment of an address hopping instruction 300. The address hopping instruction may describe an address hopping sequence and an address hop trigger. The address hopping instruction 300 may be addressed to a node identifier (ID) 310 representing the network node 104 to follow the address hopping pattern. The address hopping instruction 300 may identify an address hop trigger 320, such as a timer 322 or an event 324. The address hopping instruction 300 may list a precedent network address 330 and a series of successor network addresses 340.

Figure 4:
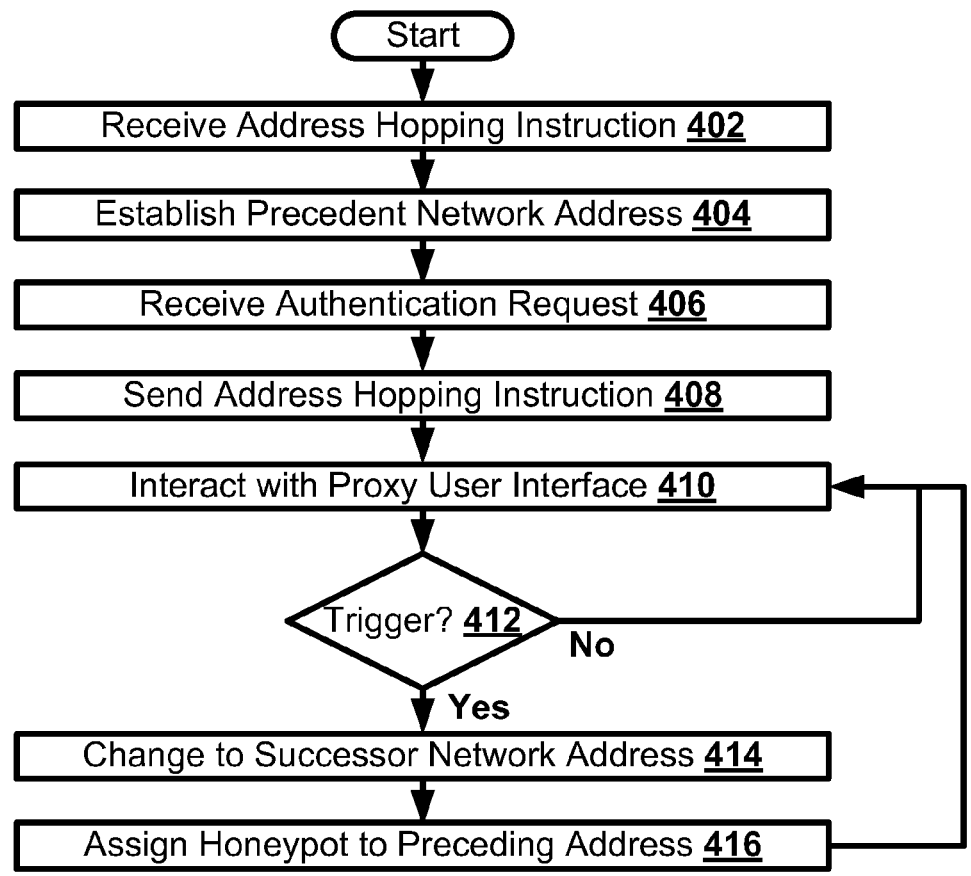
FIG. 4 illustrates, in a flowchart, one method of establishing a stealth network node.

FIG. 4 illustrates, in a flowchart, one method 400 of establishing a stealth network node. The network node 104 may receive an address hopping instruction 300 from an address hopping management entity (Block 402). The network node 104 may establish a precedent network address 330 to represent the network node 104 in a network 100 (Block 404). The network node 104 may receive an authentication request from a user device 102 (Block 406). The network node 104 may send an address hopping instruction to the user device 102 (Block 408). The network node 104 may interact with a proxy to present the user with a seamless connection experience (Block 410). If the network node recognizes an address hop trigger (Block 412), the network node 104 may change to a successor network address to represent the network node 104 in the network 100 (Block 414). The network node 104 may assign a honeypot 120 to the precedent network address after changing to the successor network address (Block 416). The network node may continue to interact with a proxy user interface to present the user with a seamless connection experience (Block 410).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for protecting a network node from malicious mapping, comprising:
receiving an address hopping instruction from at least one of a hypervisor, an end-node operating system network stack and a network interface card extension;
establishing a precedent network address to represent the network node in a network;
recognizing an address hop trigger;
changing to a successor network address to represent the network node in the network;
receiving an authentication request from a user device;
sending an address hopping instruction to the user device in response to the authentication request; and
interacting with a proxy to present the user device with a seamless connection experience while implementing the address hopping, wherein the address hopping instruction describes an address hopping sequence and the address hop trigger.

2. The method of claim 1, wherein the address hop trigger is at least one of a temporal hop trigger and an event hop trigger.

3. The method of claim 1, further comprising:
assigning a honeypot to the precedent network address after changing to the successor network address.

4. A non-transitory machine-readable data storage medium on which is recorded a set of instructions that, when executed by one or more processors, causes the one or more processors to perform a method comprising:
receiving an address hopping instruction from at least one of a hypervisor, an end-node operating system network stack and a network interface card extension;
establishing a precedent network address to represent the network node in a network;
recognizing an address hop trigger;
changing to a successor network address to represent the network node in the network;
receiving an authentication request from a user device;
sending an address hopping instruction to the user device in response to the authentication request; and
interacting with a proxy to present the user device with a seamless connection experience while implementing the address hopping,
wherein the address hopping instruction describes an address hopping sequence and the address hop trigger.

5. The non-transitory machine-readable data storage medium of claim 4, wherein the address hop trigger is at least one of a temporal hop trigger and an event hop trigger.

6. The non-transitory machine-readable data storage medium of claim 4, wherein the method further comprises:
assigning a honeypot to the precedent network address after changing to the successor network address.

* * * * *